United States Patent
Barot et al.

(10) Patent No.: US 11,015,841 B2
(45) Date of Patent: May 25, 2021

(54) MOLECULAR SIEVE CHAMBER

(71) Applicant: OxiCool Inc., Malvern, PA (US)

(72) Inventors: Ravikant T. Barot, Phoenixville, PA (US); Brandon K. Wilcox, Downington, PA (US)

(73) Assignee: OxiCool Inc., Malvern, PA (US)

( * ) Notice: Subject to any disclaimer, the term of this patent is extended or adjusted under 35 U.S.C. 154(b) by 235 days.

(21) Appl. No.: 15/506,612

(22) PCT Filed: Aug. 24, 2015

(86) PCT No.: PCT/US2015/046528
§ 371 (c)(1),
(2) Date: Feb. 24, 2017

(87) PCT Pub. No.: WO2016/032952
PCT Pub. Date: Mar. 3, 2016

(65) Prior Publication Data
US 2018/0172321 A1 Jun. 21, 2018

Related U.S. Application Data

(60) Provisional application No. 62/041,768, filed on Aug. 26, 2014.

(51) Int. Cl.
*B01D 53/02* (2006.01)
*F25B 17/08* (2006.01)
(Continued)

(52) U.S. Cl.
CPC .............. *F25B 17/08* (2013.01); *F25B 35/04* (2013.01); *F25B 37/00* (2013.01); *Y02A 30/27* (2018.01); *Y02B 30/00* (2013.01); *Y02B 30/62* (2013.01)

(58) Field of Classification Search
CPC .......... F25B 17/08; F25B 35/04; F24B 37/00; Y02A 30/277; Y02A 30/278; Y02B 30/62; Y02B 30/64
See application file for complete search history.

(56) References Cited

U.S. PATENT DOCUMENTS 3,164,452 A 1/1965 Hayes
3,432,995 A * 3/1969 Jaeger ................ B01D 53/0423
96/126

(Continued)

FOREIGN PATENT DOCUMENTS

DE 102011079581 A1 1/2013

OTHER PUBLICATIONS

PCT Search Report & Written Opinion for Application No. PCT/US2015/046528 dated Nov. 23, 2015, 10 pages.
(Continued)

*Primary Examiner* — Christopher P Jones
(74) *Attorney, Agent, or Firm* — Lee & Hayes, P.C.

(57) ABSTRACT

A molecular sieve chamber comprises a plurality of containers generally parallel to another and arranged in a matrix having adjacent rows that may be offset from one another. The plurality of containers may be spaced from one another forming a plurality of tortuous air passages from a first side of the molecular sieve chamber to a second side of the molecular sieve chamber opposite the first side. Each of the plurality of containers may include a venting passage having a plurality of apertures, and at least one molecular sieve positioned between the venting passage and a solid sidewall. A fan may be configured to blow air between the plurality of containers in a direction generally perpendicular to a longitudinal axis of the plurality of containers. The venting passages of each of the plurality of containers may be fluidly coupled to one another.

21 Claims, 8 Drawing Sheets

(51) Int. Cl.
*F25B 35/04* (2006.01)
*F25B 37/00* (2006.01)

(56) References Cited

U.S. PATENT DOCUMENTS

| | | | |
|---|---|---|---|
| 3,759,062 A | | 9/1973 | Wrenn et al. |
| 4,601,114 A | * | 7/1986 | Noguchi .............. B01D 53/261 |
| | | | 34/451 |
| 5,035,065 A | * | 7/1991 | Parkinson ................. F26B 5/06 |
| | | | 34/299 |
| 5,509,956 A | | 4/1996 | Opperman et al. |
| 5,593,478 A | * | 1/1997 | Hill ................... B01D 53/0446 |
| | | | 96/111 |
| 5,813,248 A | | 9/1998 | Zornes et al. |
| 7,311,763 B2 | | 12/2007 | Neary |
| 7,836,723 B2 | | 11/2010 | Kaufman et al. |
| 2008/0078532 A1 | | 4/2008 | Nagashima et al. |
| 2010/0043462 A1 | | 2/2010 | Barot et al. |
| 2010/0314084 A1 | | 12/2010 | Takeuchi et al. |
| 2015/0209711 A1 | * | 7/2015 | Walker ................... B01D 45/12 |
| | | | 55/419 |
| 2016/0010916 A1 | * | 1/2016 | Byfield ................. F25J 1/0022 |
| | | | 62/611 |
| 2016/0030878 A1 | * | 2/2016 | Ji .............................. C07C 7/13 |
| | | | 526/64 |

OTHER PUBLICATIONS

The Extended European Search Report dated Mar. 20, 2018 for European patent application No. 15835712.9, 6 pages.
The European Office Action dated Oct. 29, 2018, fro European Application No. 15835712.9, a counterpart foreign application of U.S. Appl. No. 15/506,612, 4 pages.

* cited by examiner

MOLECULAR SIEVE CHAMBER

CROSS-REFERENCE TO RELATED APPLICATIONS

CROSS-REFERENCE TO RELATED APPLICATIONS

This application is the U.S. National Stage application of International application No. PCT/US2015/046528 filed Aug. 24, 2015 entitled "Molecular Sieve Chamber,", which claims the benefit of U.S. Provisional Patent Application No. 62/041,768 filed Aug. 26, 2014 entitled "Molecular Sieve Chamber", both of which is are incorporated by reference herein in its their entirety.

FIELD OF THE INVENTION

The present invention generally relates to a molecular sieve chamber and, more particularly, to a molecular sieve chamber for use in an adsorption cooling system.

BACKGROUND OF THE INVENTION

Molecular sieve chambers for adsorption cooling systems using water as a refrigerant have been developed for air conditioning and other cooling systems. Examples of adsorption cooling systems are shown and described in U.S. Patent Application Publication No. 2010/0043462, U.S. Pat. No. 7,836,723, and U.S. Pat. No. 5,813,248, which are hereby incorporated by reference in their entirety.

BRIEF SUMMARY OF THE INVENTION

In one embodiment there is a molecular sieve chamber comprising: a plurality of containers each having a sidewall, each of the plurality of containers including: a venting passage having a plurality of apertures; and at least one molecular sieve positioned between the venting passage and the sidewall. In one embodiment, the plurality of containers are arranged in a matrix having a plurality of rows and columns. In one embodiment, adjacent rows of the matrix are offset from one another. In one embodiment, a smallest space between alternate rows of the matrix is less than a diameter of one of the plurality of containers. In one embodiment, the plurality of containers are spaced from one another forming a plurality of air passages from a first side of the molecular sieve chamber to a second side of the molecular sieve chamber opposite the first side. In one embodiment, each of the plurality of air passages path is tortuous. In one embodiment, the plurality of containers are generally parallel to one another.

In one embodiment, the plurality of containers are each a cylindrical tube. In one embodiment, the plurality of containers are comprised of metal. In one embodiment, the venting passage is a cylindrical tube. In one embodiment, the venting passage is comprised of a wire mesh. In one embodiment, the venting passage includes at least one support member extending across a diameter of the venting passage. In one embodiment, the at least one molecular sieve includes a plurality of beads. In one embodiment, the at least one molecular sieve is comprised of zeolite. In one embodiment, the at least one molecular sieve is comprised of a metal organic framework material. In a further embodiment, the molecular sieve chamber further comprises a fan configured to blow air between the plurality of containers in a direction generally perpendicular to a longitudinal axis of one of the plurality of containers. In one embodiment, the at least one molecular sieve is sealed within the plurality of containers and the plurality of containers are maintained under an internal vacuum. In one embodiment, the venting passages of the plurality of containers are each fluidly coupled to one another. In one embodiment, a smallest dimension of the at least one molecular sieve is larger than a largest dimension of one of the plurality of apertures of the venting passage. In one embodiment, the venting passage is generally concentric with the sidewall.

In another embodiment there is a molecular sieve chamber comprising: a plurality of containers each having a solid sidewall, the plurality of containers being generally parallel to another and arranged in a matrix having adjacent rows that are offset from one another, the plurality of containers being spaced from one another forming a plurality of tortuous air passages from a first side of the molecular sieve chamber to a second side of the molecular sieve chamber opposite the first side, each of the plurality of containers having: a venting passage having a plurality of apertures, and at least one molecular sieve positioned between the venting passage and the solid sidewall; and a fan configured to blow air between the plurality of containers in a direction generally perpendicular to a longitudinal axis of the plurality of containers, wherein the venting passages of each of the plurality of containers are fluidly coupled to one another.

In another embodiment there is a cooling system comprising: a refrigerant chamber; and at least one molecular sieve chamber comprising: a plurality of containers each having a solid sidewall, each of the plurality of containers including: a venting passage fluidly coupled to the refrigerant chamber and having a plurality of apertures, and at least one molecular sieve positioned between the venting passage and the solid sidewall.

BRIEF DESCRIPTION OF THE SEVERAL VIEWS OF THE DRAWINGS

The following detailed description of embodiments of the molecular sieve chamber will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
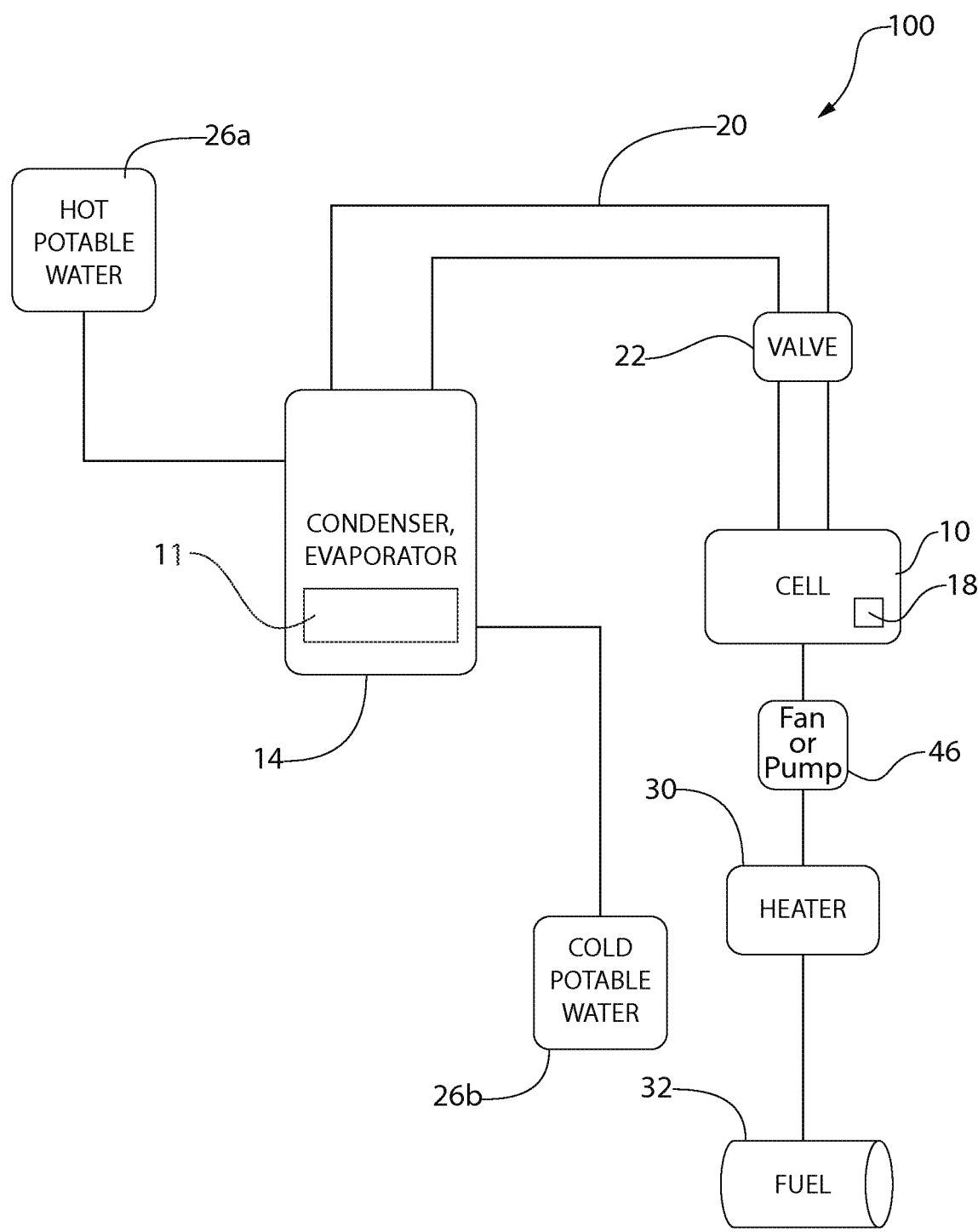
FIG. 1 is a schematic diagram of a cooling system in accordance with an exemplary embodiment of the present invention.

Referring to the drawings in detail, there is shown in FIGS. 2-8 a molecular sieve chamber or cell, generally designated 10, in accordance with an exemplary embodiment of the present invention. The molecular sieve chamber 10 may be used as part of a cooling system 100 (see FIG. 1). Exemplary uses of cooling systems 100 include air conditioning for homes, buildings and vehicles, potable liquid cooling systems (e.g., portable military or hiking water systems), on demand cooling for beverage dispensing systems (e.g., water, sports drinks, beer), industrial and environmental applications (e.g., cooling exhaust temperature of an incinerator), vaccine and organ transport, battery and data center cooling, military and athletic uniforms and protective apparel, and motorsport (e.g., motorcycle) apparel.

Referring to FIG. 1, cooling system 100 includes a refrigerant 11 contained within a refrigerant chamber 14. In one embodiment, refrigerant chamber 14 is fluidly coupled to at least one molecular sieve chamber 10 containing a molecular sieve or adsorbent or other suitable material 18. Refrigerant chamber 14 may be fluidly coupled to the molecular sieve chamber 10 via a fluid passageway 20 such as a pipe or conduit. In one embodiment, fluid passageway 20 includes one or more valves 22 that control the fluid coupling between refrigerant chamber 14 and molecular sieve chamber 10. In one embodiment, refrigerant chamber 14 and molecular sieve chamber 10 are contained within a common housing. In other embodiments, the housing includes two or more parts. In one embodiment, refrigerant 11 is hermetically sealed within cooling system 100.

Refrigerant 11 may be cycled in a closed loop between cooling and recharging modes. In one embodiment, refrigerant 11 is water. In one embodiment, refrigerant 11 is pure water. In one embodiment, refrigerant 11 is substantially pure water. In one embodiment, refrigerant 11 is water containing no additives. In other systems, water containing adjuvants may be desired as refrigerant 11. One example of useful adjuvants is an anti-microbial (e.g., bactericidal or fungicidal) composition. In some embodiments, it is preferred that refrigerant 11 does not contain materials which would interfere with operation of cooling system 100 in its normal operation. Thus, in some embodiments, glycols and other antifreeze agents are generally to be excluded from refrigerant 11, at least in amounts effective for storing cooling system 100 in ambient conditions around or below the freezing point of refrigerant 11.

In one embodiment, the molecular sieve 18 is a material configured to adsorb and desorb refrigerant 11. In one embodiment, molecular sieve 18 is configured to provide adsorption of vaporized refrigerant 11 from refrigerant chamber 14 in a cooling mode and configured to provide desorption of refrigerant 11 back into refrigerant chamber 14 in a recharging mode. During the cooling mode, a heat transfer medium or media 26a, 26b is passed over, around and/or through refrigerant chamber 14 to form a heat exchanger coupling between heat transfer medium 26a, 26b and refrigerant chamber 14.

As vaporized refrigerant 11 moves from refrigerant chamber 14 into molecular sieve chamber 10, the pressure within refrigerant chamber 14 decreases reducing the boiling point of refrigerant 11 and causing it to evaporate, thereby decreasing the temperature of refrigerant chamber 14 and pulling heat from heat transfer medium 26a such that exiting heat transfer medium 26b is at a lower temperature than entering heat transfer medium 26a. In order to reset or recharge cooling system 100 and be ready for a subsequent cooling cycle, energy is applied to molecular sieve chamber 10 to cause the adsorbed refrigerant 11 to desorb from molecular sieve 18 and move back into refrigerant chamber 14. In one embodiment, a heater 30 having a fuel source 32 is used to apply heat to molecular sieve 18 in the recharging mode.

Referring to FIGS. 2-7, the molecular sieve chamber 10 includes a plurality of containers 34 that are in fluid communication with one another and each having a sidewall 34a. The containers 34 may each contain at least one molecular sieve 18 and a venting passage 38 having a mesh or plurality of apertures that allow the refrigerant 11 to pass through the wall of the venting passage 38 and in and out of the container 34. The plurality of containers 34 may be configured to form a single molecular sieve chamber 10 such that the molecular sieve 18 in each of the plurality of containers 34 adsorb simultaneously and desorb simultaneously.

In one embodiment, the containers 34 have a solid, sealed sidewall 34a with no openings or apertures to the ambient environment. In one embodiment, the containers 34 are only open to another sealed environment at the top of each container 34. The containers 34 may be in the shape of a hollow cylindrical tube such that the horizontal cross section is a ring shape. In other embodiments, the containers 34 may have a different horizontal cross sectional shape such as triangular, oval, diamond, almond, tear, or rectangular or other polygons. The containers 34 may be identical to one another in size and shape. In other embodiments, the containers 34 have different sizes and shapes from one another. In one embodiment, each container 34 has a diameter of approximately 0.25 inches to approximately 5 inches. In one embodiment, each solid sidewall 34a has a thickness of less than 0.25 inches. In one embodiment, each solid sidewall 34a has a thickness of approximately 0.001 inches to approximately 0.005 inches. In one embodiment, each solid sidewall 34a has a thickness of approximately 0.01 inches to approximately 0.05 inches. In one embodiment, each solid sidewall 34a has a thickness of approximately 0.1 inches to approximately 0.5 inches. In one embodiment, the containers 34 have a closed bottom and an open top. In one embodiment, the containers 34 are open on each end.

The containers 34 may be comprised of a thermally conductive and thermally durable material such as stainless steel. In other embodiments, the containers 34 are comprised of other thermally conductive and thermally durable materials such as ferrous metal, nonferrous metal, ceramic, glass or a polymeric material.

Figure 2:
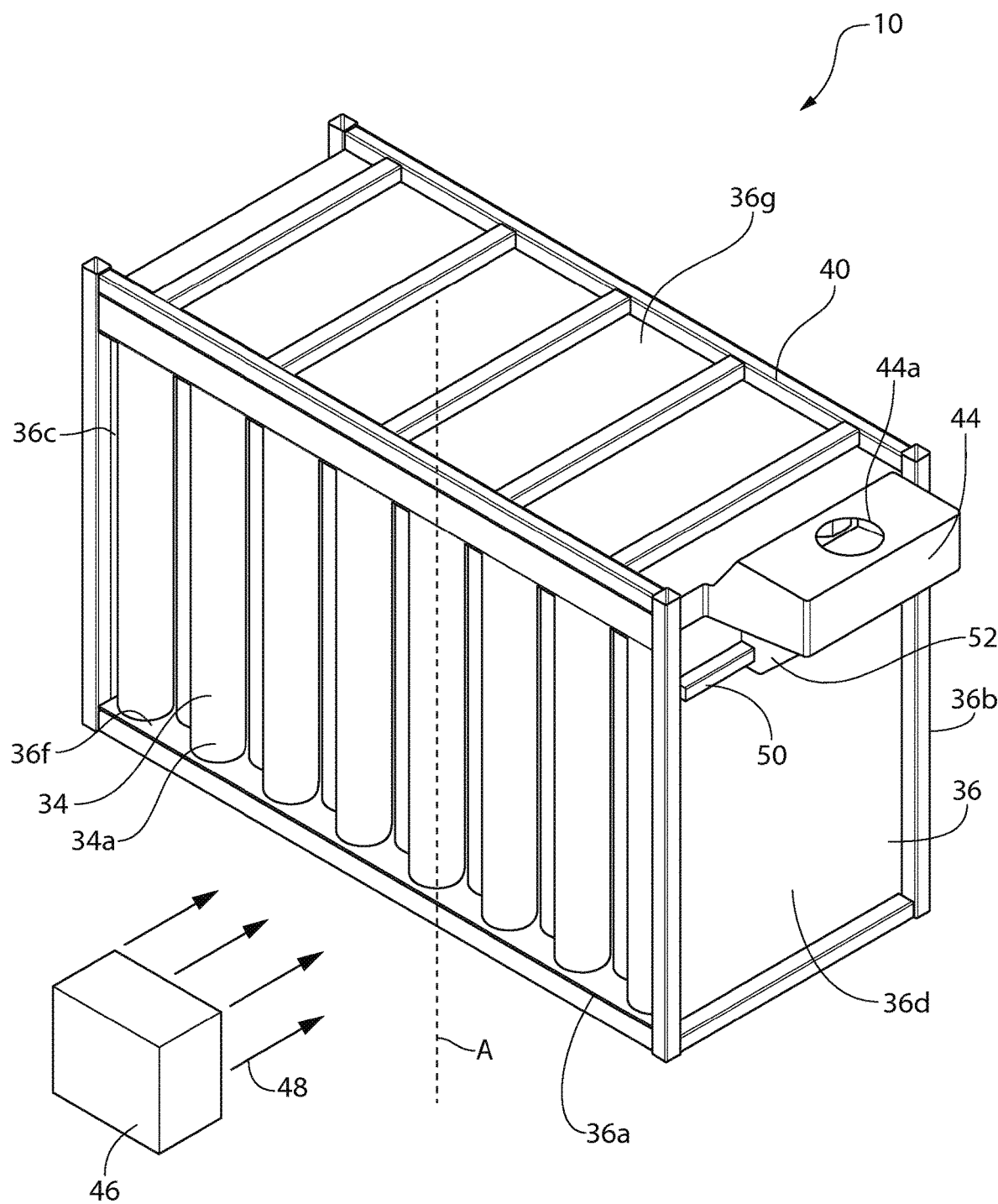
FIG. 2 is a perspective view of a molecular sieve chamber in accordance with an exemplary embodiment of the present invention.
Figure 3:
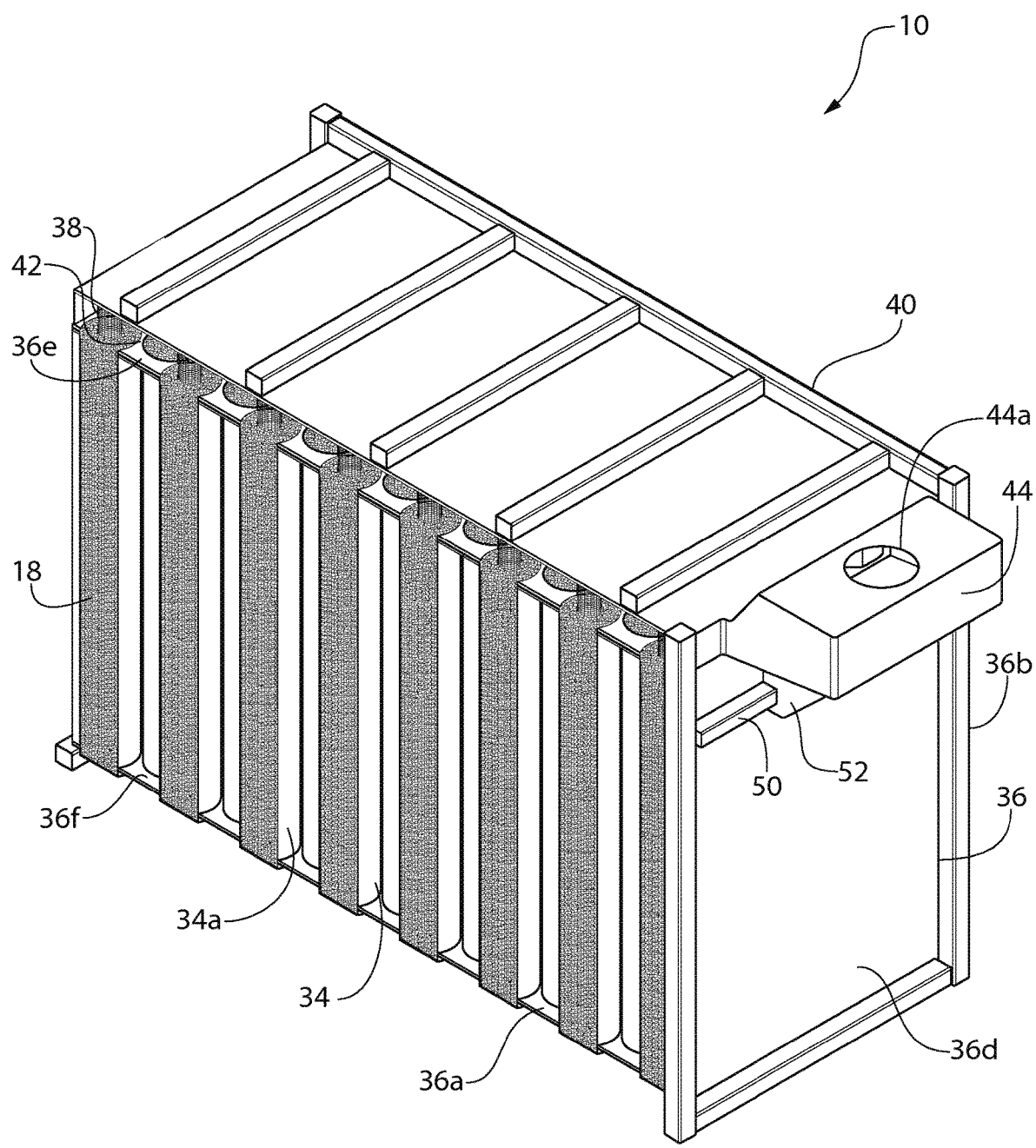
FIG. 3 is a perspective view of a vertical cross section of the molecular sieve chamber shown in FIG. 2.
Figure 4:
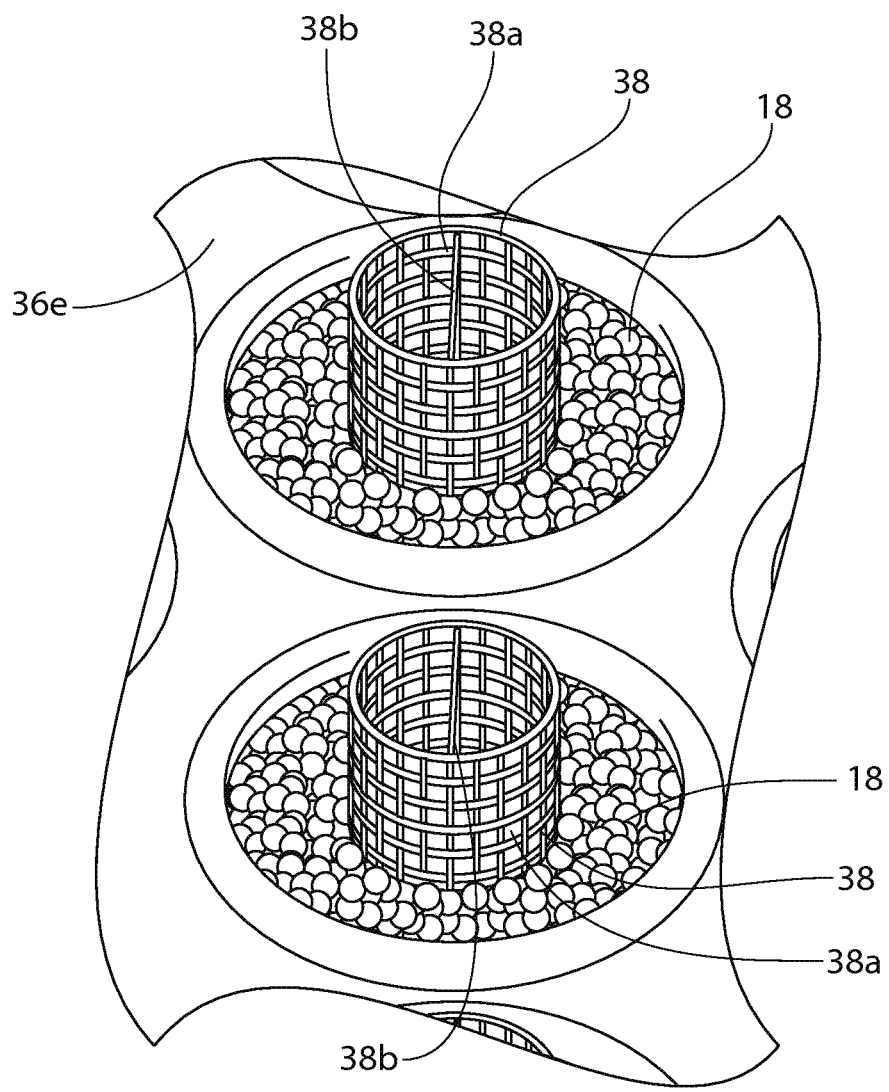
FIG. 4 is a close up view inside the upper space of the molecular sieve chamber shown in FIG. 2.
Figure 5:
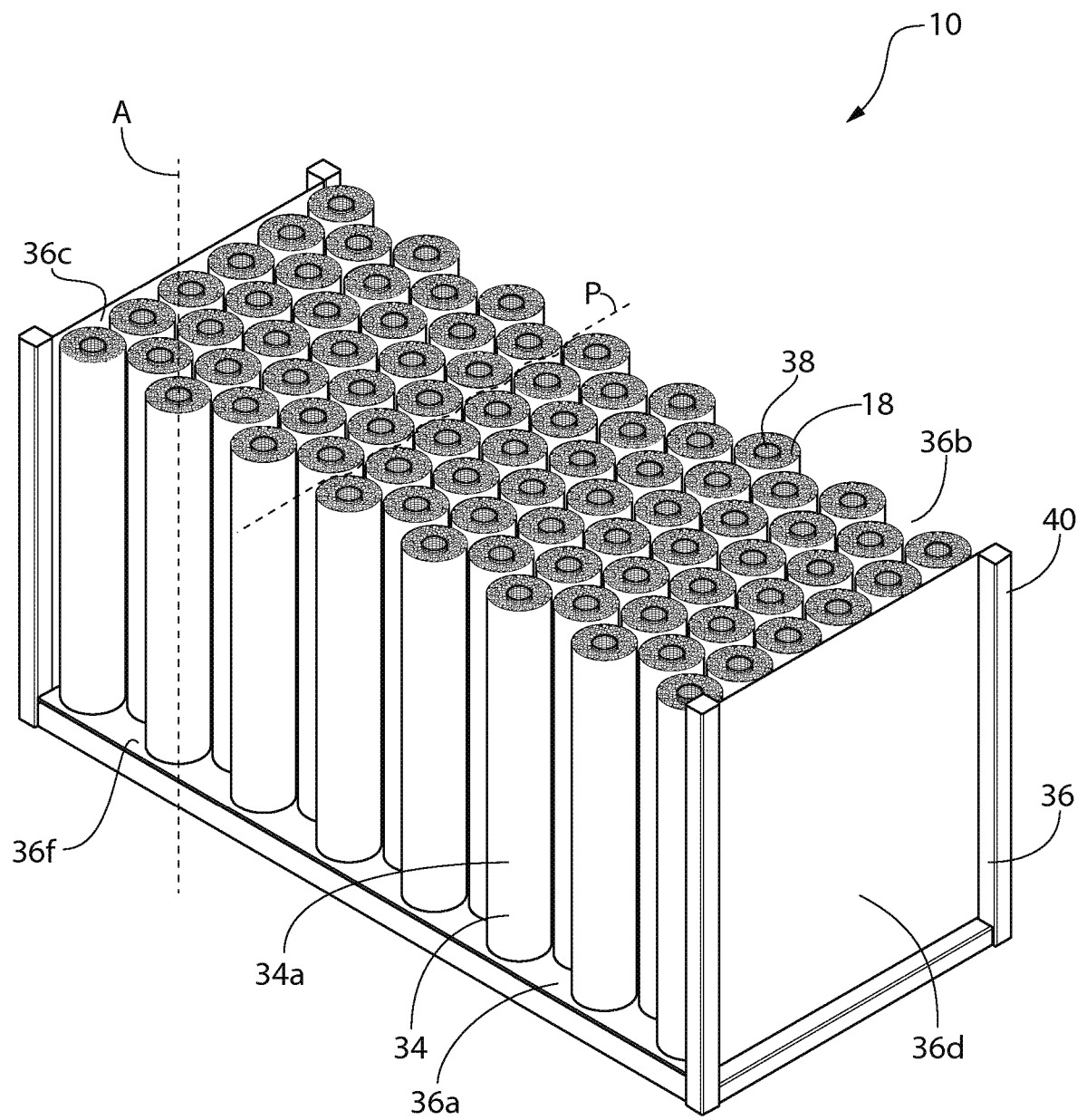
FIG. 5 is a perspective view of a horizontal cross section of the molecular sieve chamber shown in FIG. 2.
Figure 6:
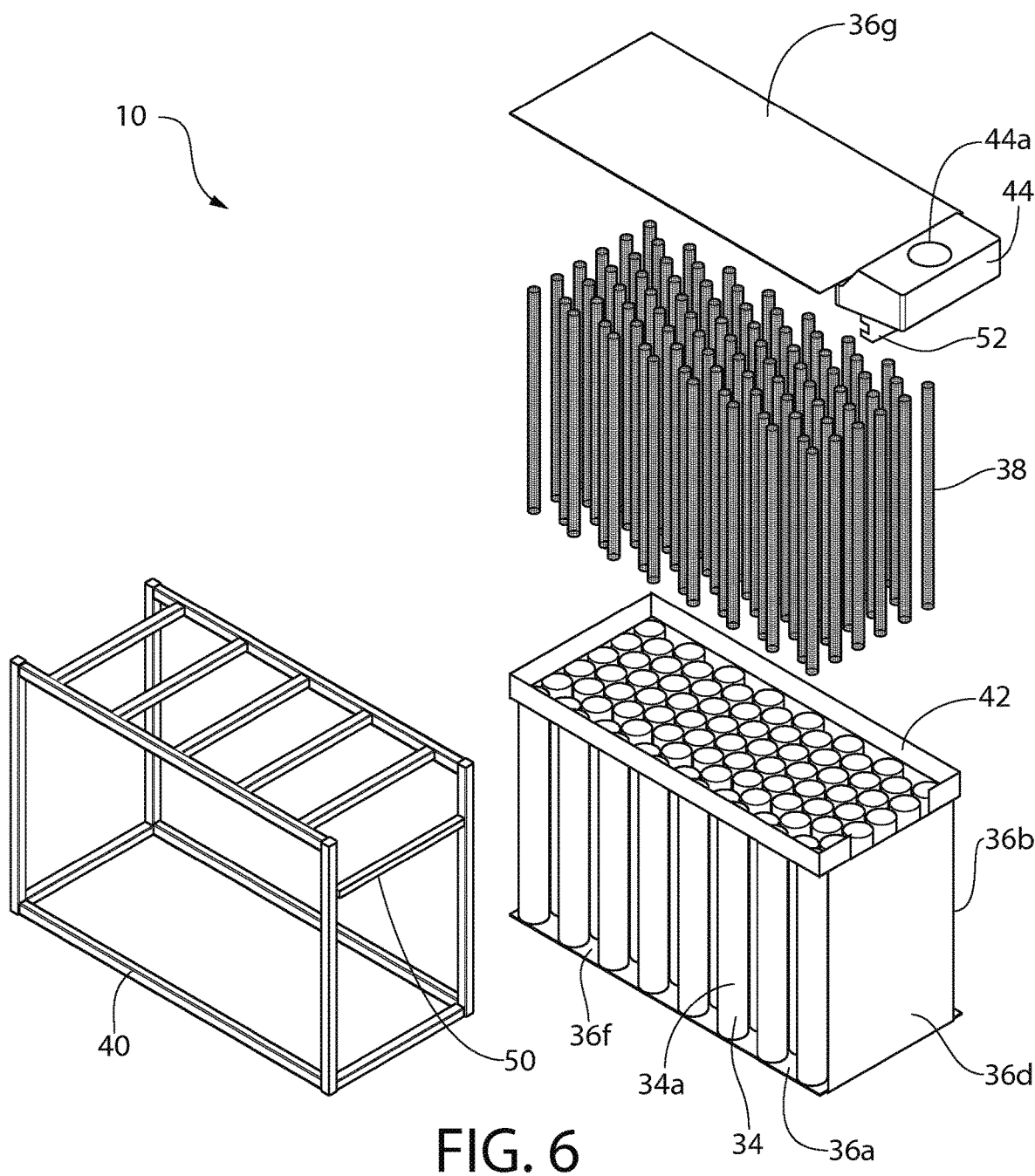
FIG. 6 is an exploded perspective view of the molecular sieve chamber shown in FIG. 2 with the molecular sieve material removed.
Figure 7:
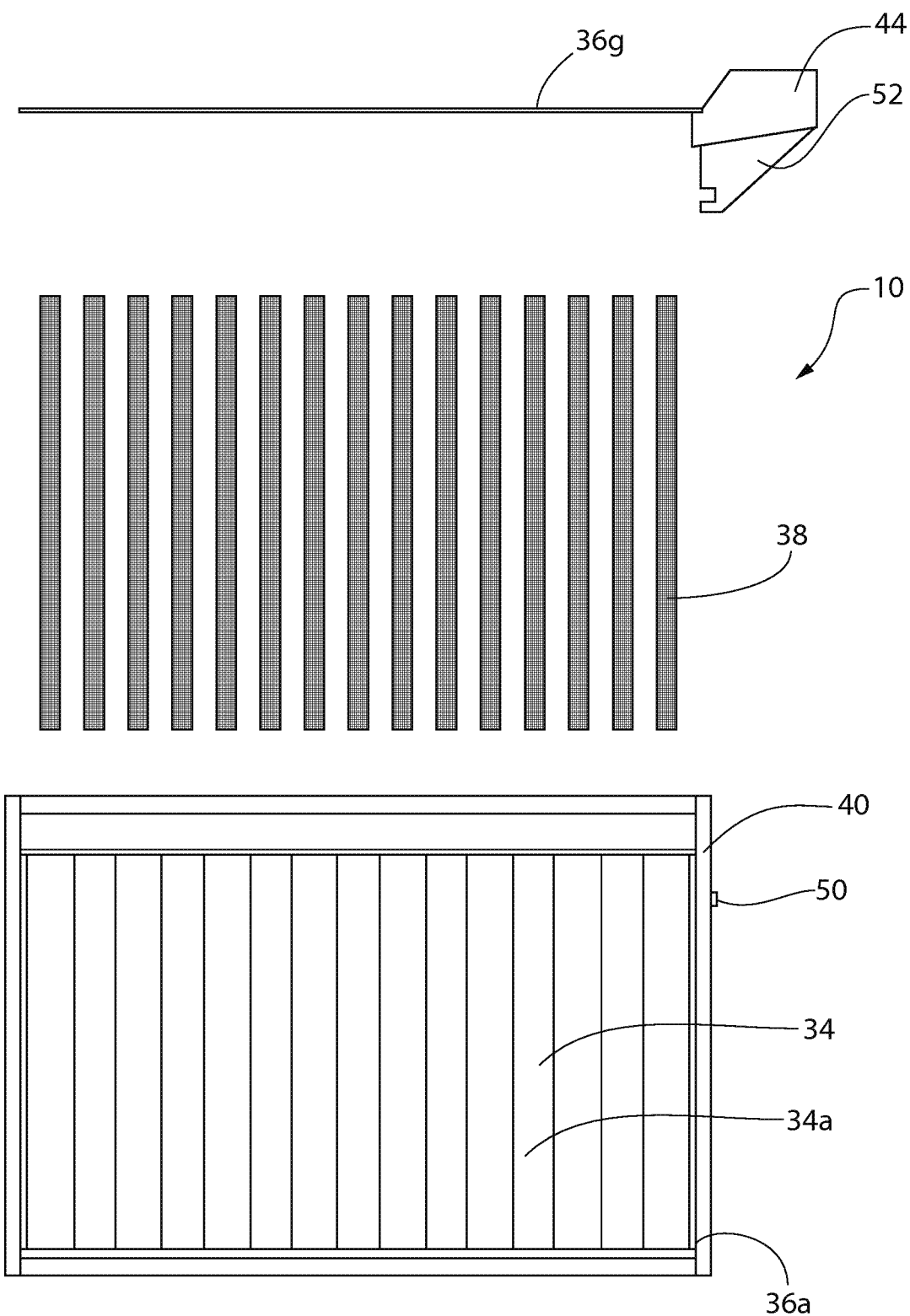
FIG. 7 is an exploded side view of the molecular sieve chamber shown in FIG. 2 with the molecular sieve material removed.
Figure 8:
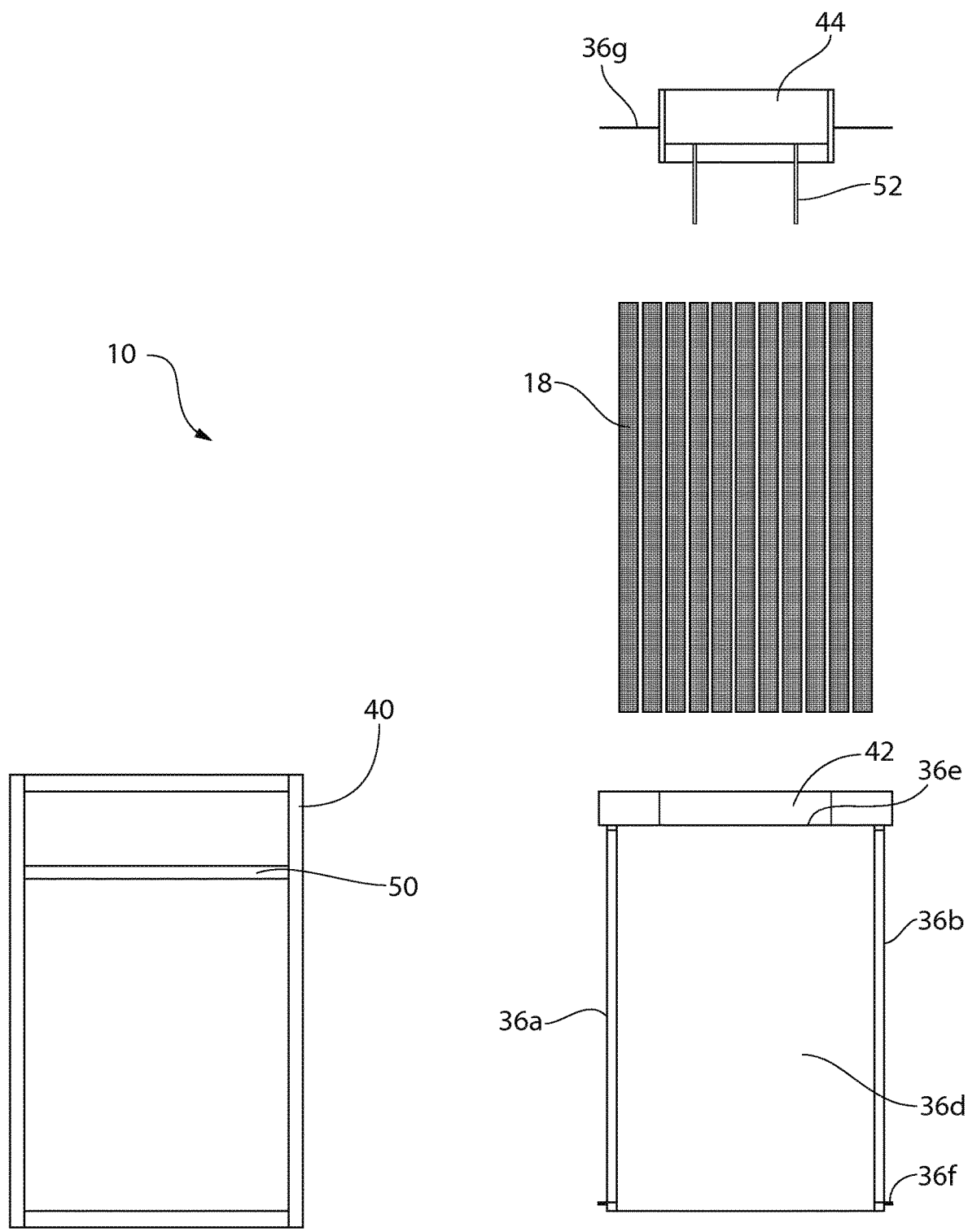
FIG. 8 is an exploded front view of the molecular sieve chamber shown in FIG. 2 with the molecular sieve material removed.

Referring to FIGS. 3-5, each container 34 may include a venting passage 38 that extends at least partially through the container 34. In other embodiments, each container 34 includes two or more venting passages 38. The molecular sieve 18 may be positioned between the sidewall 34a of the container 34 and the outside of the venting passage 38 and to create a hollow or open space free of molecular sieve 18 that extends at least partially along the longitudinal axis A (see FIG. 2) of the container 34. The venting passage 38 may include a plurality of apertures 38a (see FIG. 4) that allow for the adsorbed and desorbed refrigerant to pass through the venting passage 38 to access the molecular sieve 18 more evenly along the longitudinal axis A of the container 34. In another embodiment, the venting passage 38 alternatively or additionally surrounds the molecular sieve 18 such that a venting passage 38 is formed between the container 34 and the molecular sieve 18. In another embodiment, the molecular sieve 18 is retained against the outer surface of the container 34 by a mesh material so that the illustrated embodiment is reversed and the heat exchange happens inside the containers 34 and the refrigerant 11 passes top and from the molecular sieve 18 through the mesh material on the outside of the containers 34.

The venting passages 38 may be in the shape of a hollow cylindrical tube such that the horizontal cross section is a ring shape. In other embodiments, the venting passages 38 may have a different cross sectional shape such as triangular, oval, diamond, almond, tear, or rectangular or other polygon. The venting passages 38 may have a generally constant cross section along the longitudinal axis A of the container 34. In other embodiments, the cross section of the venting passages 38 varies along the longitudinal axis A of the container 34. The venting passages 38 may be identical to one another in size and shape. In other embodiments, the venting passages 38 have different sizes and shapes from one another. In one embodiment, the venting passage 38 has the same general shape as the corresponding container 34. In one embodiment, the venting passage 38 has a different shape than the corresponding container 34. In one embodiment, each venting passage 38 has a diameter of approximately ⅛th of an inch to approximately 4 inches. The venting passages 38 may be generally parallel with the respective container 34. In other embodiments, the venting passage 38 is nonparallel with the respective container 34. The venting passage 38 may be generally concentric with the sidewall 34a of the respective container 34. In other embodiments, the venting passage 38 in nonconcentric with the sidewall 34a of the respective container 34.

The venting passage 38 may be comprised of a thermally conductive and thermally durable material such stainless steel. In one embodiment, venting passage 38 is a mesh or perforated tube. In other embodiments, the venting passages 38 are comprised of other thermally conductive and thermally durable materials such as ferrous metal, nonferrous metal, ceramic, glass or a polymeric material. In one embodiment, the venting passage is created by having a void in the molecular sieve. In one embodiment, this void is created by a process of extruding the molecular sieve. In one embodiment, this void is created by a process of drilling, boring, or cutting in the molecular sieve. In one embodiment, the venting passage 38 is coupled to a heating source to further heat the molecular sieve 18 during the recharging mode.

Referring to FIG. 4, the venting passage 38 may include at least one support member 38b that extends across a diameter of the venting passage 38, generally perpendicular to the longitudinal axis A and at least partially along the length of the venting passage 38, generally parallel to the longitudinal axis A. The support member 38b may be provided to add radial support to the venting passage 38 and help prevent the venting passage 38 from collapsing under the weight of the molecular sieve 18. The support member 38b may be provided to ease the manufacturing of the venting passage. The support member 38b may be comprised of the same material as the remainder of the venting passage 38. In other embodiments, the support member 38b is comprised of a different material from the remainder of the venting passage 38. In one embodiment, the support member 38b is integrally formed with the remainder of the venting passage 38 such as by bending and wrapping the material around the support member. In other embodiments, the support member 38b is separately attached to the remainder of the venting passage 38 or is excluded entirely.

The at least one molecular sieve 18 may be positioned between the venting passage 38 and the container 34. The molecular sieve 18 may include a plurality of pieces. In one embodiment, the molecular sieve 18 includes a plurality of beads of molecular sieve material. In one embodiment, the molecular sieve 18 includes a plurality of pellets of molecular sieve material. In one embodiment, the smallest dimension of each bead or pellet of the molecular sieve 18 is larger than a largest dimension of one of the plurality of apertures 38a of the venting passage 38. In other embodiments, the molecular sieve 18 is a monolith or unitary structure. In one embodiment, the molecular sieve material is coated onto the inner surface of the container 34.

In one embodiment, molecular sieve 18 exhibits a high ability to adsorb refrigerant 11 and to remain in an adsorbed state over practical lengths of time, while maintaining physical and physicochemical form and function. Such materials may be useful when they exhibit a high ability to adsorb water, efficient and effectively reversible desorption of water upon application of heat energy, and physical and physicochemical stability during and following repeated adsorption and desorption cycles.

In one embodiment, molecular sieve 18 includes a desiccant material. In one embodiment, molecular sieve 18 is a desiccant. In one embodiment, molecular sieve 18 is zeolite. A zeolite may be described as, but without limitation, hydrous aluminum silicate in porous granules. Exemplary zeolites that may be used include analxime, chabazite, heulandite, natrolite, phillipsite and stilbite. In one embodiment, molecular sieve 18 is any drying agent that maintains its physical structure when substantially fully contacted with water. In other embodiments, molecular sieve 18 is any adsorptive and/or absorptive material and/or a material having adsorptive properties including but not limited to diatomaceous earth, activated alumina, silica gel, calcium aluminosilicate clay, molecular sieves (e.g., electrically charged molecular sieves), metal organic framework materials, activated carbon, and/or lithium chloride. In other embodiments, molecular sieve 18 may be an electrically chargeable and dischargeable material (e.g., a porous slab or particles of material such as a metal including aluminum, stainless steel and alloys thereof) such that electrical energy is used to control the electrical charge of the pores of the material to adsorb and desorb refrigerant 11 from molecular sieve 18.

Referring to FIGS. 2, 3 and 5, the containers 34 may be at least partially supported by a housing 36. The housing 36 may include open front and rear opposing sidewalls 36a, 36b, closed left and right opposing sidewalls 36c, 36d, and closed top and bottom opposing sidewalls 36e, 36f. The molecular sieve chamber 10 may include a frame 40. In one embodiment, the frame 40 adds additional support to the housing 36. Proximate the top of the molecular sieve chamber 10, there may be a space 42 between the top sidewall 36e and a top cover 36g. The space 42 may be sealed from the ambient environment and in fluid communication with the molecular sieve 18 inside of each container 34. The space 42 and the inside of each of the containers 34 are sealed from the ambient environment. In one embodiment, the space 42 and the inside of each of the containers 34 are vacated to form a vacuum. In one embodiment, the space 42 and the open space inside of each of the containers 34 are maintained under a partial vacuum with the exception of the vaporized refrigerant 11 entering and exiting during the cooling and recharging modes.

The venting passages 38 may extend partially or completely across the space 42 to prevent the molecular sieve 18 from entering the inside of the venting passage 38. In one embodiment, the venting passage has a top to prevent the molecular sieve 18 from entering the inside of the venting passage 38. In one embodiment, a retainer may be provided on top of the molecular sieve 18 to keep the molecular sieve 18 within each container 34. In one embodiment, an additional or alternative space similar to space 42 may be provided at the bottom of the containers 34 and/or along the length of the containers 34. The space 42 may be in fluid communication with a dock 44 including an aperture 44a for fluidly and connecting a sealed conduit for the adsorbed and desorbed refrigerant 11 entering and leaving the molecular sieve chamber 10. The dock 44 may include a latch 52 that couples to a support bar 50 of the frame 40.

Referring to FIGS. 2 and 3, the containers 34 may extend downwardly from the top sidewall 36e and the space 42 to expose at least a portion of the outside of the containers 34 to act as a heat exchanger. A fan or pump 46 may be provided to blow or pump heat exchange media 48, such as air, water, synthetic or non-synthetic oil, or molten salt, across the outside of the exposed containers 34 and heat or cool the molecular sieve 18 within each container 34. In one embodiment, the media 48 extends across the containers 34 in a direction generally perpendicular to the longitudinal axes A of the containers 34. In one embodiment, the media 48 extends across the containers 34 in a direction generally parallel to the longitudinal axes A of the containers 34. In one embodiment, the media 48 extends across the containers 34 in a direction at an angle between generally parallel and generally perpendicular to the longitudinal axes A of the containers 34.

Referring to FIG. 5, the longitudinal axes A of the plurality of containers 34 may be generally parallel to one another. In one embodiment, the containers 34 are arranged in a matrix of rows and columns. In one embodiment, there are 15 rows and 11 columns of containers 34 as illustrated. In other embodiments, there may be fewer than or more than 15 rows of containers 34 and fewer than or more than 11 columns of containers 34. In other embodiments, the containers 34 are arranged in a different pattern such as generally concentric circles or a non-pattern. The containers 34 may be spaced from one another forming a plurality of air passages from a first side of the molecular sieve chamber 10 to a second side of the molecular sieve chamber opposite the first side.

In one embodiment, adjacent rows of the matrix are offset from one another so that the adjacent containers 34 are closer to one another than if the rows were aligned with one another. Closely spacing the containers 34 allows for the passing heat exchange media 48 (see FIG. 2) to be forced through a tortuous path P to go from the open sidewall 36a to the opposing open sidewall 36b. In one embodiment, the entrance and exit for the heat exchange media 48 is on the same sidewall and/or on perpendicular sidewalls. In one embodiment, there is not a clear line of sight from the open sidewall 36a to the opposing open sidewall 36b. In one embodiment, the smallest space between alternate rows of the matrix (e.g., a first row and a third row) is less than a diameter of a container 34. In one embodiment, the smallest space between adjacent containers 34 is less than approximately 2 inches. In one embodiment, the smallest space between adjacent containers 34 is approximately 0.02 inches to approximately 2 inches. In one embodiment, the spacing between adjacent containers 34 is consistent from column to column and row to row. In other embodiments, the spacing between adjacent containers 34 varies between rows and/or columns. For example, the containers 34 may be spaced further apart from one another proximate the fan or pump 46 and more closely together further from the fan or pump 46 to compensate for the temperature change of the heat exchange media 48 as it passes over the containers 34. The heat exchange media 48 may quickly pass over the first few columns of containers 34 while the heat exchange media 48 is closest to its original temperature and more slowly pass over the last few columns of containers 34 after some of the energy has been transferred between the containers 34 and the heat exchange media 48. In some embodiments, there are multiple heating or cooling sources entering and exiting the array of containers 34 from multiple entry and exit passages. In some embodiments, there are diverters and/or guides between or proximate the containers 34 to distribute the airflow through the array of containers 34. In some embodiments, the containers 34 are spaced and/or shaped to aid in airflow management and distribution. In one embodiment, the spacing and/or alignment of containers 34 allows for one or more clear line of sight through the containers 34. In some embodiments, the containers 34 are similar to one another. In other embodiments, the containers 34 have different thicknesses, cross sections shapes, and/or different lengths from one another. In other embodiments, the molecular sieve chamber 10 includes a single container 34 having one or more venting passages 38.

The closed left and right opposing sidewalls 36c, 36d, and closed top and bottom opposing sidewalls 36e, 36f may help direct the heat exchange media 48 from the one side of the molecular sieve chamber 10 to the other side of the molecular sieve chamber 10. In one embodiment, a hot heat exchange media 48 is applied to the containers 34 in the recharging mode. In some embodiments, a cool heat exchange media 48 is applied to the containers 34 prior to and/or during the cooling cycle. Though illustrated with the longitudinal axis A of the containers 34 extending vertically, in use, the longitudinal axis A of the containers 34 may be positioned horizontally or at an angle between vertical and horizontal.

The molecular sieve chamber 10 may be configured such that the exposed surface area of the containers 34 is sufficiently large to maximize the heat transfer between the heat exchange media 48 and the molecular sieve 18. In some embodiments, the containers 10 and/or support members include heat transfer enhancements to increase surface area and/or turbulate the heating and cooling media such as coating, fins, dimpling, scoring and heat exchange media deflection/turbulation devices.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A molecular sieve chamber comprising:
   a plurality of containers each having a solid sealed sidewall, each of the plurality of containers including:
   a venting passage disposed along a longitudinal axis of the container, the venting passage having a plurality of apertures; and
   at least one molecular sieve positioned between the venting passage and the sidewall, wherein the plurality of containers are arranged in a matrix having plurality of rows and columns; and
   a housing comprising:
      an open front sidewall and an open rear sidewall;
      a closed left sidewall and a closed right sidewall;
      a closed top sidewall and a closed bottom sidewall; and
      a top cover installed on the top sidewall to create a space between the top cover and the top sidewall,
      wherein the space and an inside of each of the plurality of containers are sealed from an environment, and each sealed sidewall of the plurality of containers is exposed to the environment, and
      wherein a cooling or heating medium may be applied to at least one of the exposed each sidewall of the plurality of containers.

2. The molecular sieve chamber of claim 1, wherein adjacent rows of the matrix are offset from one another.

3. The molecular sieve chamber of claim 2, wherein a smallest space between alternate rows of the matrix is less than a diameter of one of the plurality of containers.

4. The molecular sieve chamber of claim 1, wherein the plurality of containers are spaced from one another forming a plurality of air passages from a first side of the molecular sieve chamber to a second side of the molecular sieve chamber opposite the first side.

5. The molecular sieve chamber of claim 4, wherein each of the plurality of air passages path is tortuous.

6. The molecular sieve chamber of claim 1, wherein the plurality of containers are generally parallel to one another.

7. The molecular sieve chamber of claim 1, wherein the plurality of containers are each a cylindrical tube.

8. The molecular sieve chamber of claim 1, wherein the plurality of containers are comprised of metal.

9. The molecular sieve chamber of claim 1, wherein the venting passage is a cylindrical tube.

10. The molecular sieve chamber of claim 1, wherein the venting passage is comprised of a wire mesh.

11. The molecular sieve chamber of claim 1, wherein the venting passage includes at least one support member extending across a diameter of the venting passage.

12. The molecular sieve chamber of claim 1, wherein the at least one molecular sieve includes a plurality of beads.

13. The molecular sieve chamber of claim 1, wherein the at least one molecular sieve is comprised of zeolite.

14. The molecular sieve chamber of claim 1, wherein the at least one molecular sieve is comprised of a metal organic framework material.

15. The molecular sieve chamber of claim 1 further comprising:
   a fan configured to blow air between the plurality of containers in a direction generally perpendicular to a longitudinal axis of one of the plurality of containers.

16. The molecular sieve chamber of claim 1, wherein the at least one molecular sieve is sealed within the plurality of containers and the plurality of containers are maintained under an internal vacuum.

17. The molecular sieve chamber of claim 1, wherein the venting passages of the plurality of containers are each fluidly coupled to one another.

18. The molecular sieve chamber of claim 1, wherein a smallest dimension of the at least one molecular sieve is larger than a largest dimension of one of the plurality of apertures of the venting passage.

19. The molecular sieve chamber of claim 1, wherein the venting passage is generally concentric with the sidewall.

20. A molecular sieve chamber comprising: a plurality of containers each having a solid sealed sidewall exposed to an environment, wherein a topside and a bottom sidewall seal an inside of the at least one molecular sieve chamber from the environment, the plurality of containers being generally parallel to one another and arranged in a matrix having adjacent rows that are offset from one another, the plurality of containers being spaced from one another forming a plurality of tortuous air passages from a first side of the molecular sieve chamber to a second side of the molecular sieve chamber opposite the first side, each of the plurality of containers having: a venting passage having a plurality of apertures, and at least one molecular sieve positioned between the venting passage and the solid sealed sidewall; and a fan configured to blow air between the plurality of containers in a direction generally perpendicular to a longitudinal axis of the plurality of containers, wherein the venting passages of each of the plurality of containers are fluidly coupled to one another.

21. A cooling system comprising:
   a refrigerant chamber; and
   at least one molecular sieve chamber comprising:
      a plurality of containers each having a solid sealed sidewall exposed to an environment, wherein a topside and a bottom sidewall seal an inside of the at least one molecular sieve chamber from the environment, each of the plurality of containers including:
      a venting passage fluidly coupled to the refrigerant chamber and having a plurality of apertures, and
      at least one molecular sieve positioned between the venting passage and the solid sealed sidewall, wherein the plurality of containers are arranged in a matrix having plurality of rows and columns.

* * * * *